US012560519B2

(12) United States Patent
Lee et al.

(10) Patent No.: US 12,560,519 B2
(45) Date of Patent: Feb. 24, 2026

(54) MICRO CONCENTRATION MONITORING APPARATUS

(71) Applicant: KOREA UNIVERSITY RESEARCH AND BUSINESS FOUNDATION, Seoul (KR)

(72) Inventors: Hyung Min Lee, Seoul (KR); Seung Beom Ku, Seongnam-si (KR)

(73) Assignee: Korea University Research and Business Foundation, Seoul (KR)

( * ) Notice: Subject to any disclaimer, the term of this patent is extended or adjusted under 35 U.S.C. 154(b) by 384 days.

(21) Appl. No.: 18/472,371

(22) Filed: Sep. 22, 2023

(65) Prior Publication Data

US 2024/0142362 A1 May 2, 2024

(30) Foreign Application Priority Data

Nov. 2, 2022 (KR) ......................... 10-2022-0144107

(51) Int. Cl.
B81B 7/02 (2006.01)
G01N 15/06 (2006.01)

(52) U.S. Cl.
CPC .................................... G01N 15/06 (2013.01)

(58) Field of Classification Search
CPC ................................................. B81B 2201/02
See application file for complete search history.

(56) References Cited

U.S. PATENT DOCUMENTS

| | | | | |
|---|---|---|---|---|
| 8,336,373 B2 * | 12/2012 | Kwon | ..................... | G01G 3/13 |
| | | | | 73/61.79 |
| 11,415,455 B2 * | 8/2022 | Rogers | .................. | G01H 13/00 |
| 2004/0233458 A1 * | 11/2004 | Frick | ...................... | G01L 11/00 |
| | | | | 331/65 |

FOREIGN PATENT DOCUMENTS

DE 102016108964 * 3/2019

* cited by examiner

*Primary Examiner* — John E Breene
*Assistant Examiner* — Alex T Devito
(74) *Attorney, Agent, or Firm* — NSIP Law

(57) ABSTRACT

Disclosed is a micro concentration monitoring apparatus. A micro concentration monitoring apparatus includes: a variable frequency driver circuit unit that is coupled to a MEMS sensor and supplies constant power to the MEMS sensor within a set bandwidth; and a reading circuit unit that measures a resonance frequency displacement value of the MEMS sensor according to a change in dielectric constant of a target based on power supplied from the variable frequency driver circuit, and measures the resonance frequency displacement value of the MEMS sensor through a plurality of measurement channels, respectively.

7 Claims, 6 Drawing Sheets

NEGATIVE FEEDBACK LOOP CIRCUIT UNIT 340

310 320 330

INCREASE OUTPUT VOLTAGE OF POWER AMPLIFIER

SLOWLY INCREASE OUTPUT VOLTAGE OF ENVELOPE DETECTOR

DECREASE OUTPUT VOLTAGE OF SUBTRACTOR

DECREASE OUTPUT VOLTAGE OF SAMPLE AND HOLD CIRCUIT UNIT

DECREASE INPUT VOLTAGE OF LINEAR REGULATOR

DECREASE OUTPUT VOLTAGE OF LINEAR REGULATOR

DECREASE OUTPUT VOLTAGE OF POWER AMPLIFIER

MICRO CONCENTRATION MONITORING APPARATUS

CROSS-REFERENCE TO RELATED APPLICATION

This application claims under 35 U.S.C. § 119(a) the benefit of Korean Patent Application Nos. 10-2022-0144107 filed on Nov. 2, 2022, the entire contents of which are incorporated herein by reference.

BACKGROUND

(a) Technical Field

The present invention relates to a micro concentration monitoring apparatus.

(b) Background Art

Recently, as the use of disposable products of plastics and disposable masks of polypropylene has increased due to direct and indirect effects of the COVID-19 pandemic, microplastics are being generated in various living environments such as rivers, household water supply and sewerage, and indoor environments in workplaces. Microplastics refer to very small plastics less than 5 mm in size, and are classified into primary microplastics which are made small from the beginning, and secondary microplastics which are finely broken and split. The microplastics are hardly biodegradable and remain for a long time. Microplastics flow into the sea, contaminating the marine ecosystem, and accumulate in humans, the top predators, becoming a threatening factor that disrupts the human body's biological functions.

In addition, microplastics have been detected in infant feces, newborn meconium, and the blood of healthy people. Existing measurement technologies for detecting microplastics include spectroscopy such as TGA-FT-IR and Raman, and pyrolysis methods such as pyrolysis GC-MS, TDS-GC/MS, and TED-GC-MS, but have problems such as expensive equipment, long analysis time, and lack of standardized equipment. Therefore, it is necessary to develop core technologies for monitoring the concentration of microplastics.

SUMMARY OF THE DISCLOSURE

The present invention is to provide a micro concentration monitoring apparatus.

In addition, the present invention is to provide a micro concentration monitoring apparatus capable of stably supplying constant power to a MEMS sensor by compensating for input impedance mismatching due to a change in frequency of a variable frequency driver.

According to an aspect of the present invention, a micro concentration monitoring apparatus is provided.

According to an embodiment of the present invention, there may be provided a micro concentration monitoring apparatus including: a variable frequency driver circuit unit that is coupled to a MEMS sensor and supplies constant power to the MEMS sensor within a set bandwidth; and a reading circuit unit that measures a resonance frequency displacement value of the MEMS sensor according to a change in dielectric constant of a target based on power supplied from the variable frequency driver circuit, and measures the resonance frequency displacement value of the MEMS sensor through a plurality of measurement channels, respectively.

The variable frequency driver circuit unit may include: a digital-to-analog conversion circuit unit; a voltage control oscillator that is disposed at a rear end of the digital-to-analog conversion circuit unit and outputs a variable frequency signal according to an input voltage output from the digital-to-analog conversion circuit unit; a power amplifier that is located at a rear end of the voltage-controlled oscillator and outputs an output voltage by amplifying a frequency signal of the voltage-controlled oscillator; and a negative feedback loop circuit unit that compensates for input impedance mismatch of the power amplifier.

The negative feedback loop circuit unit may include: a linear regulator that provides a supply voltage to the power amplifier; an envelope detector that is disposed at a rear end of the power amplifier; a subtractor that is disposed at a rear end of the envelope detector; and a sample and hold circuit unit that is disposed at a rear end of the subtractor, in which, when an output voltage of the subtractor decreases before the envelope detector is saturated to a certain voltage, as the output voltage of the sample and hold circuit unit decreases and is applied to the linear regulator, the supply voltage to the power amplifier may decrease and input impedance mismatching may be compensated.

A power divider may be further provided at the rear end of the power amplifier to distribute the output voltage of the power amplifier, and the envelope detector may be disposed at one end of the power divider, and a dual frequency controller may be disposed at the other end thereof.

The dual frequency controller may adjust the sampling frequency of the sample and hold circuit unit to a desired value before the output voltage of the power amplifier converges to a constant value.

The reading circuit unit may include: a plurality of measurement channel front-end circuit units that receive an RF signal output from the MEMS sensor; a multiplexer that combines output signals of the plurality of measurement channel front-end circuit units into one; and an analog-to-digital conversion circuit unit that is disposed at a rear end of the multiplexer.

The plurality of measurement channel front-end circuit units may each include: an envelope detector that detects the RF signal output from the MEMS sensor; and an amplifier that is disposed at a rear end of the envelope detector and amplifies an output signal of the envelope detector.

By providing a micro concentration monitoring apparatus according to an embodiment of the present invention, it is possible to stably supply constant power to a MEMS sensor by compensating for input impedance mismatching due to a change in frequency of a variable frequency driver.

DETAILED DESCRIPTION

The singular forms used herein include plural forms unless the context clearly indicates otherwise. In the specification, it is to be noted that the terms "comprising" or "including," and the like, are not be construed as necessarily including several components or several steps described in the specification and some of the above components or steps may not be included or additional components or steps are construed as being further included. In addition, terms " . . . unit," "module," and the like, described in the specification refer to a processing unit of at least one function or operation and may be implemented by hardware or software or a combination of hardware and software.

Hereinafter, exemplary embodiments of the present invention will be described in detail with reference to the accompanying drawings.

Figure 1:
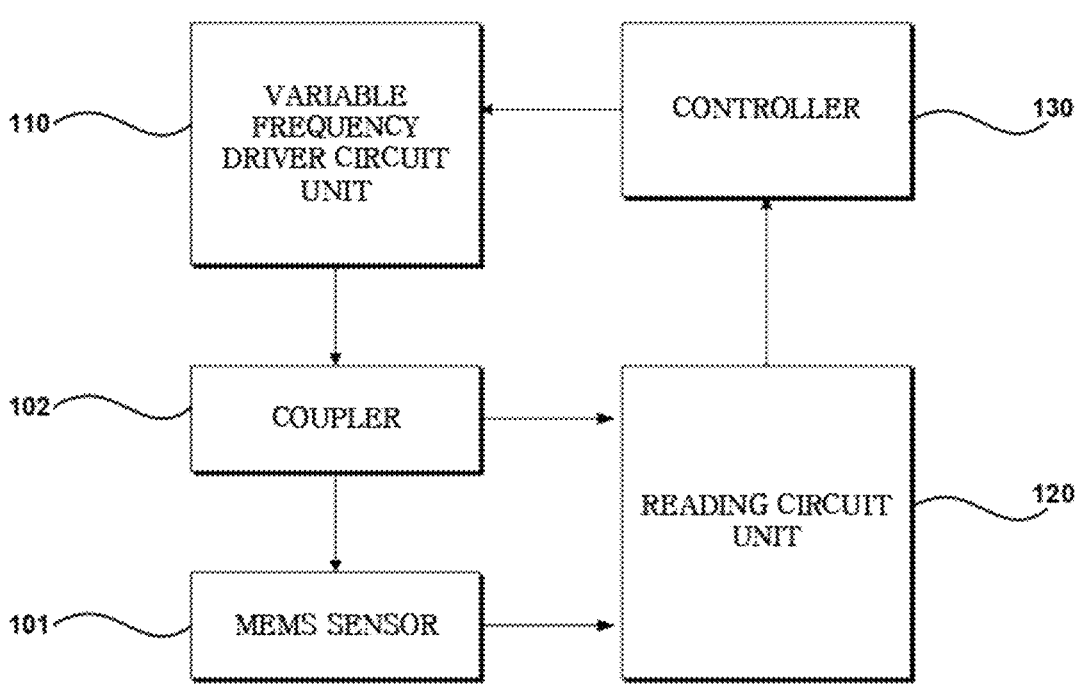
FIG. 1 is a diagram showing a configuration of a micro concentration monitoring apparatus according to an embodiment of the present invention.
Figure 2:
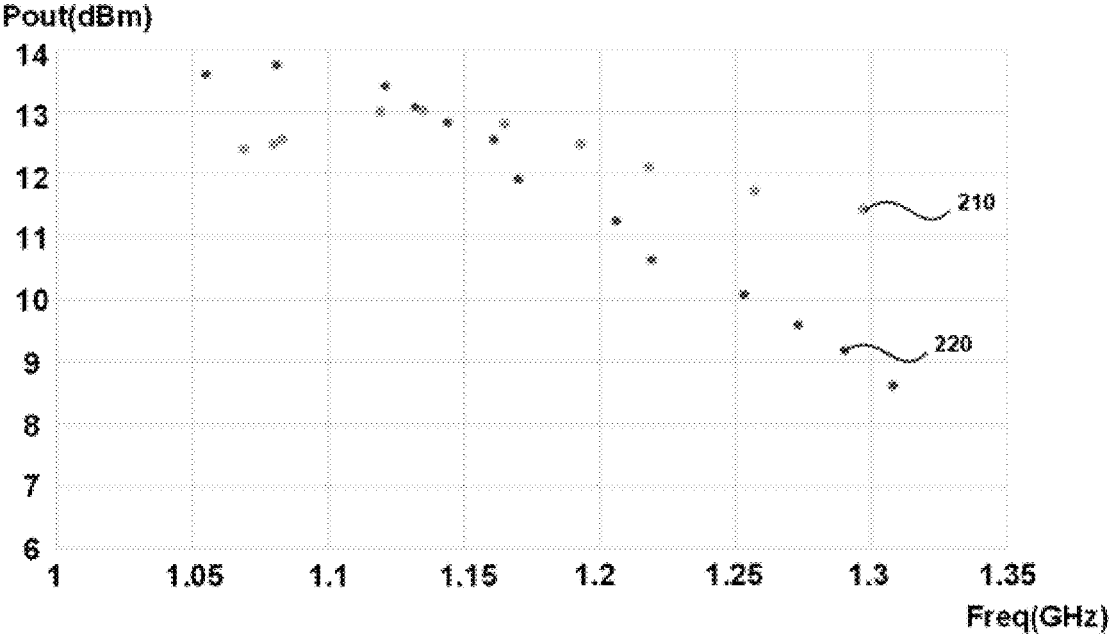
FIG. 2 is a graph showing a change in output power of a variable frequency driver according to a degree to which input impedance matching is distorted.
Figure 3:
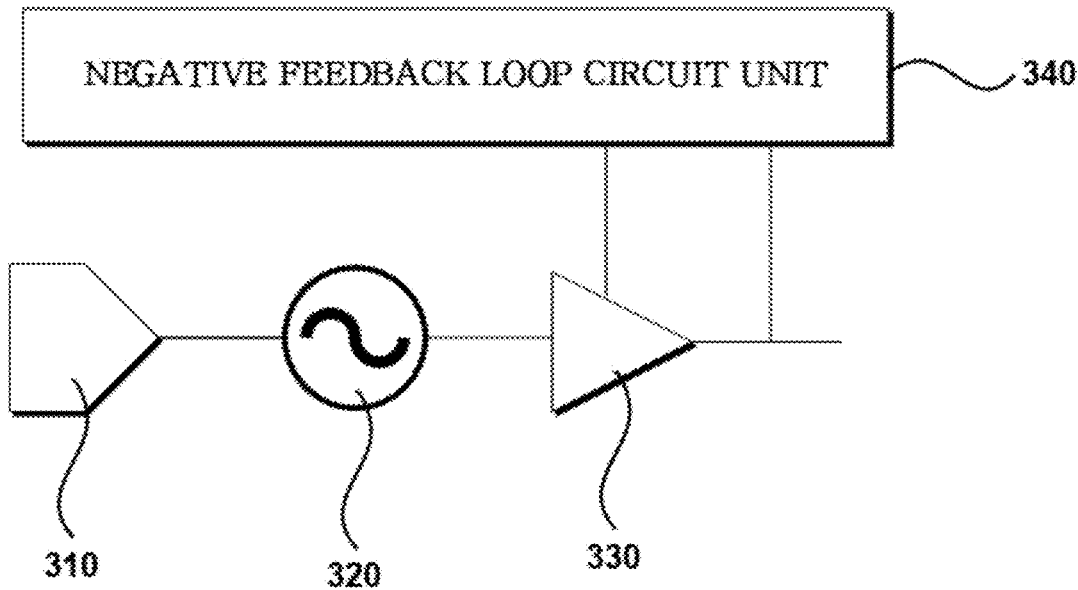
FIG. 3 is a diagram showing a configuration of a variable frequency driver circuit unit according to an embodiment of the present invention.
Figure 4:
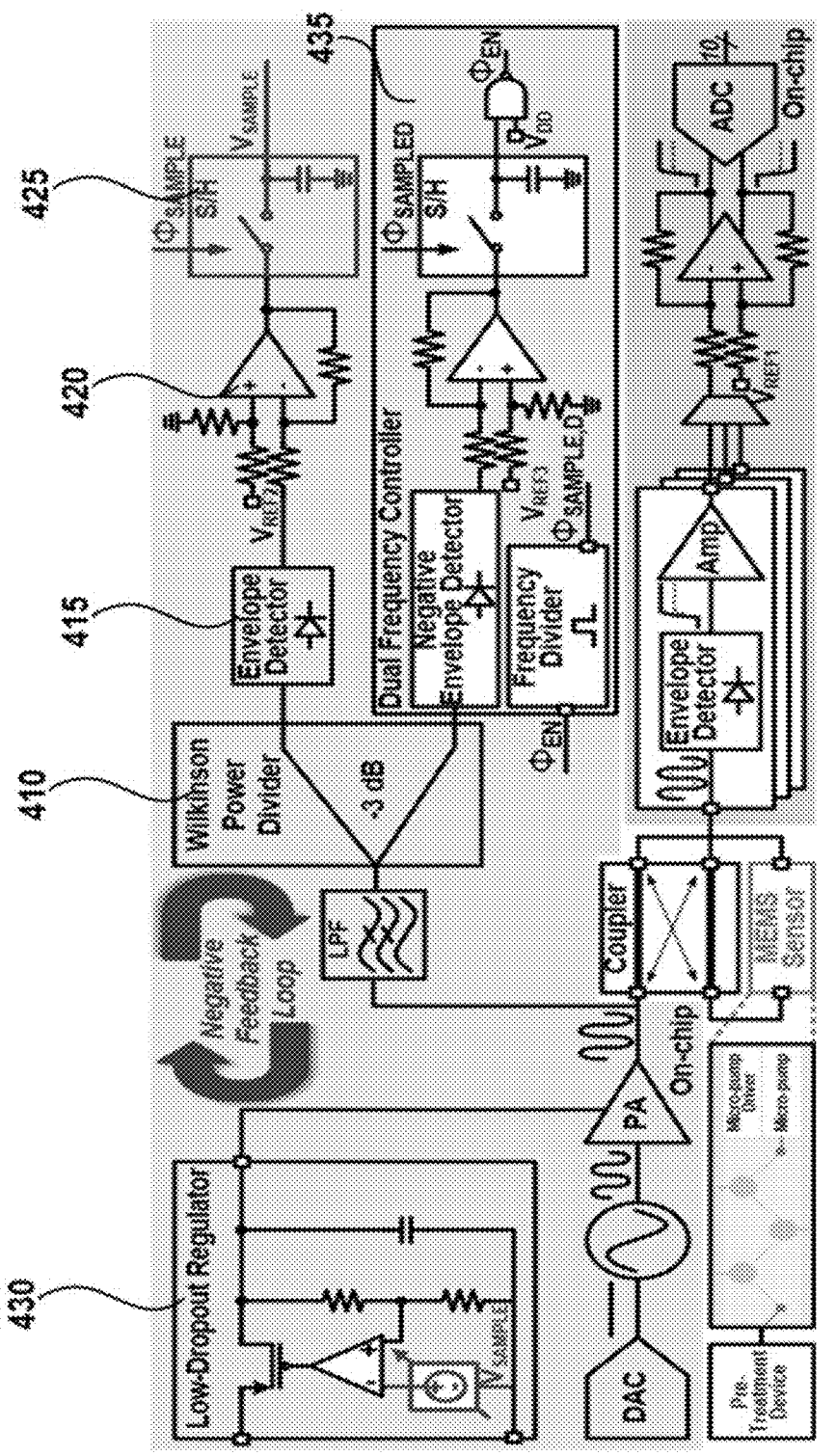
FIG. 4 is a diagram showing a detailed configuration of a negative feedback loop circuit unit according to an embodiment of the present invention.
Figure 5:
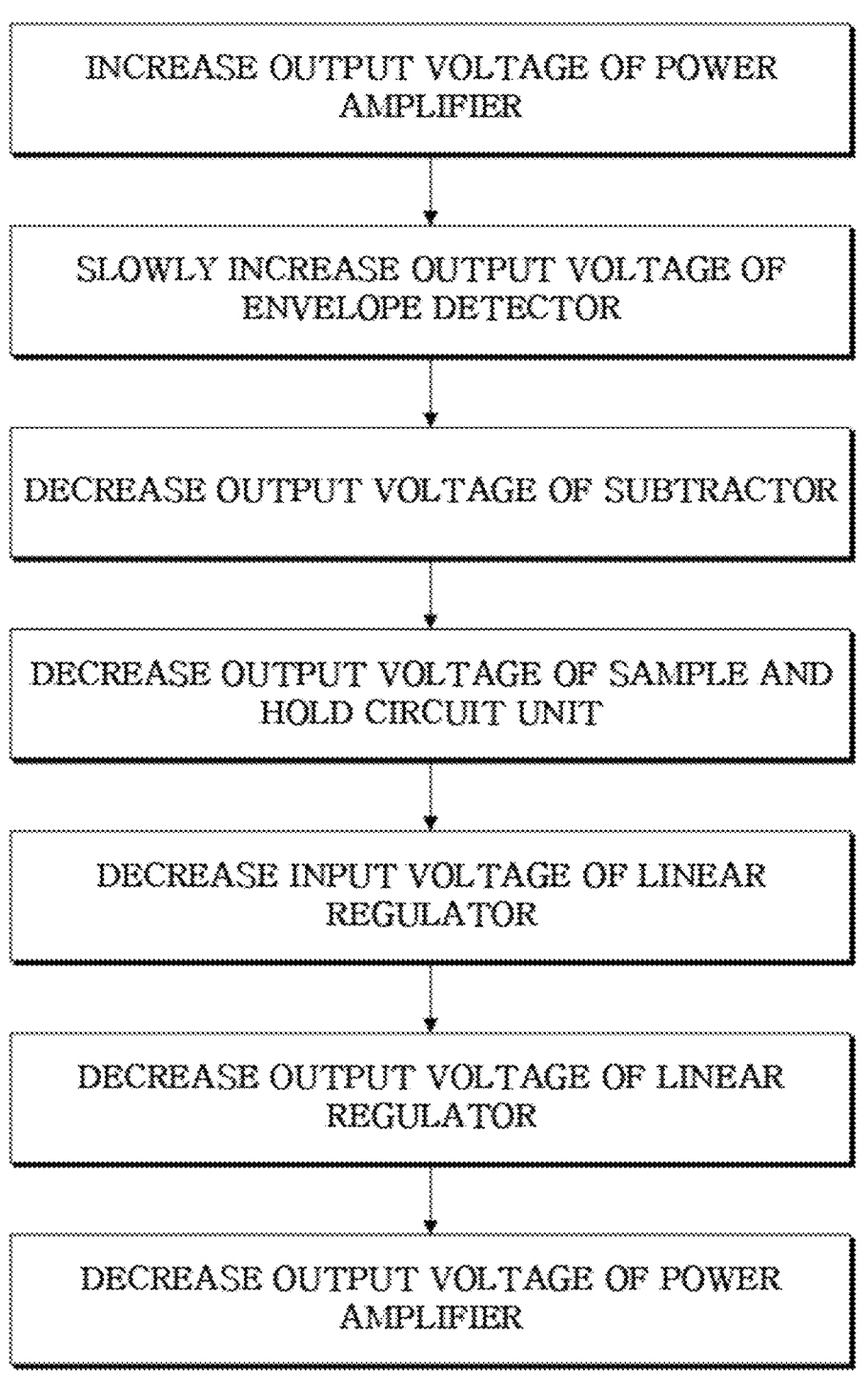
FIG. 5 is a diagram illustrating a negative feedback loop operation according to an embodiment of the present invention.
Figure 6:
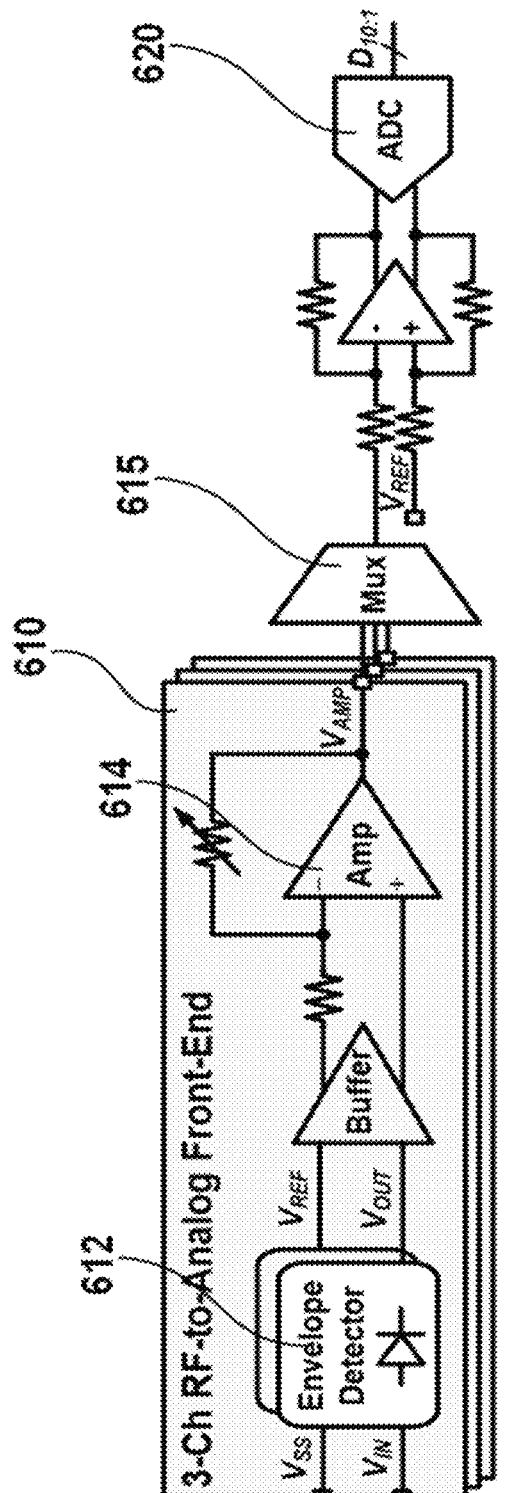
FIG. 6 is a diagram showing a detailed configuration of a reading circuit unit according to an embodiment of the present invention.
Figure 7:
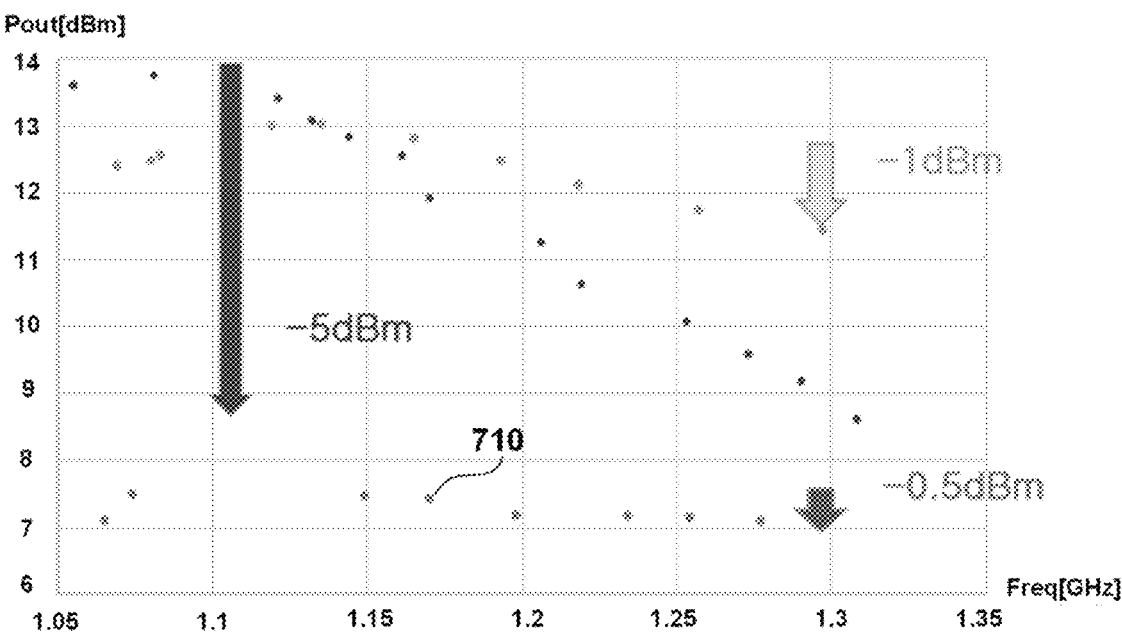
FIG. 7 is a diagram illustrating output power according to the change in frequency of the variable frequency driver circuit unit according to the embodiment of the present invention.

FIG. 1 is a diagram showing a configuration of a micro concentration monitoring apparatus according to an embodiment of the present invention, FIG. 2 is a graph showing a change in output power of a variable frequency driver according to a degree to which input impedance matching is distorted, FIG. 3 is a diagram showing a configuration of a variable frequency driver circuit unit according to an embodiment of the present invention, FIG. 4 is a diagram showing a detailed configuration of a negative feedback loop circuit unit according to an embodiment of the present invention, FIG. 5 is a diagram illustrating a negative feedback loop operation according to an embodiment of the present invention, FIG. 6 is a diagram showing a detailed configuration of a reading circuit unit according to an embodiment of the present invention, and FIG. 7 is a diagram illustrating output power according to the change in frequency of the variable frequency driver circuit unit according to the embodiment of the present invention.

Referring to FIG. 1, a micro concentration monitoring apparatus according to an embodiment of the present invention is configured to include a variable frequency driver circuit unit 110 that supplies constant power to a MEMS sensor 101 within a set bandwidth, a reading circuit unit 120 that measures a resonance frequency displacement value according to a change in dielectric constant of the corresponding MEMS sensor 101, and a controller 130. Hereinafter, the description will focus on the assumption that micro particles are microplastics.

According to an embodiment of the present invention, the description will be made on the assumption that the variable frequency driver circuit unit 110 and the reading circuit unit 120 are coupled through the MEMS sensor 101 and the coupler 102, respectively.

The variable frequency driver circuit unit 110 is a means for supplying constant power to the MEMS sensor 101 in different frequency signal sections having a constant frequency interval ($\Delta f = 1/\Delta t$) based on a center frequency $f_0$.

However, in the related art, as an input voltage of the voltage-controlled oscillator changes, the output frequency of the voltage-controlled oscillator changes, which causes the input impedance matching of the power amplifier to be distorted. As a result, there is a problem in that the power output from the voltage-controlled oscillator is not transmitted as is and some reflection occurs.

FIG. 2 is a graph illustrating the output power of the variable frequency driver circuit unit 110 according to the degree to which the input impedance matching is distorted.

As shown in FIG. 2, when the input impedance matching is slightly distorted (210), an error of up to 1 dBm occurs within the bandwidth based on the center frequency. However, when the input impedance matching is greatly distorted (220), an error of up to 5 dBm occurs, making it impossible to supply constant power to the MEMS sensor 101.

Therefore, according to one embodiment of the present invention, the variable frequency driver circuit unit 110 includes a negative feedback loop circuit unit 340 that adjusts to supply constant power to the MEMS sensor 101 within a set bandwidth.

FIG. 3 is a diagram showing a detailed configuration of the variable frequency driver circuit unit 110 according to an embodiment of the present invention.

Referring to FIG. 3, the variable frequency driver circuit unit 110 according to an embodiment of the present invention includes a digital-to-analog conversion circuit unit 310, a voltage control oscillator 320, a power amplifier 330, and a negative feedback loop circuit 340.

The digital-to-analog conversion circuit unit 310 is a means for controlling the input voltage. The digital-to-analog conversion circuit unit 310 is a means for converting a digital signal into an analog signal.

The voltage-controlled oscillator 320 is a means for generating a desired frequency according to the input voltage output from the digital-to-analog conversion circuit unit 310. That is, the voltage-controlled oscillator 320 may output a variable frequency that is linearly proportional to the input voltage.

The power amplifier 330 is a means for stably supplying the frequency (sine wave) output by the voltage-controlled oscillator 320 to the load (i.e., MEMS sensor). That is, the power amplifier 330 is a means for converting the frequency signal output by the voltage-controlled oscillator 320 into a high-power signal.

The negative feedback loop circuit unit 340 is a means for providing a feedback signal to compensate for input impedance mismatching of the power amplifier 330 so that the power amplifier 330 outputs constant power within the bandwidth.

The negative feedback loop circuit unit 340 is as shown in FIG. 4.

Referring to FIG. 4, the negative feedback loop circuit unit 340 will be described.

Referring to FIG. 4, the negative feedback loop circuit unit 340 is configured to include a power divider 410, an envelope detector 415, a subtractor 420, a sample and hold circuit unit 425, a linear regulator 430, and a dual frequency controller 435.

The power divider 410 is a means for dividing the voltage output from the power amplifier 330 and supplying the divided voltage to the envelope detector 415 and the dual frequency controller 435. Here, the power divider 410 may be a Wilkins power divider.

The envelope detector 415 is a means for detecting the envelope.

When the output voltage of the envelope detector 415 gradually increases and approaches a reference voltage $V_{REF2}$ of the subtractor 420, the output voltage of the subtractor 420 decreases.

When the output voltage of the subtractor 420 decreases, the output voltage of the sample and hold circuit unit 425 disposed at a rear end of the subtractor 420 also decreases.

The sample and hold circuit unit 425 may be disposed at the rear end of the subtractor 420, may receive an output voltage of the subtractor 420 as an input, and may maintain the amplitude of the sample at each specified period.

The output (i.e., sample) of the sample and hold circuit unit 425 may be applied to the linear regulator 430.

Typically, an operating rate of the feedback loop is faster than a saturating rate of the envelope detector 415. A feedback loop operates before the envelope detector 415 is saturated to a constant voltage, causing the stability of the entire system to collapse. Therefore, the sample and hold circuit unit 425 may be disposed in the subtractor 420 to sample the output voltage, the feedback loop may return to converge to a certain value, and the feedback loop may return to converge to a final value by sampling again.

Since the sample and hold circuit unit 425 is disposed at the rear end of the subtractor 420, when the output voltage of the subtractor 420 decreases, the output voltage of the sample and hold circuit unit 425 also decreases. When the reduced output voltage (sample) of the sample and hold circuit unit 425 is applied to the linear regulator 430, the negative feedback loop operates to decrease the supply voltage of the power amplifier 330.

As a result, the output voltage of the power amplifier 330 decreases, so the output voltage of the envelope detector 415 also decreases. After a certain time, the negative feedback loop operates, and the output voltage of the power amplifier converges to a constant value.

The dual frequency controller 435 is a means for adjusting the sampling frequency of the sample and hold circuit unit 425 to a desired value. That is, the dual frequency controller 435 may adjust the sampling frequency of the sample and hold circuit unit 425 to a desired value before the output voltage of the power amplifier 330 converges to a constant value. In the initial stage, when the desired sampling frequency is found by sampling at a high rate and reaches a saturated value, the dual frequency controller 435 operates to slow down the sampling rate of the sample and hold circuit unit 425. On the other hand, in the initial stage, when the desired sampling frequency is found by sampling at a slow rate and reaches a saturated value, the dual frequency controller 435 operates to increase the sampling rate of the sample and hold circuit unit 425.

Referring to FIG. 5 to summarize the negative feedback loop operation of the variable frequency driver circuit unit again, when the output voltage of the power amplifier 330 increases, the output voltage of the envelope detector 415 gradually increases, so the output voltage of the subtractor 420 decreases. In addition, as the output voltage of the subtractor 420 decreases, the output voltage of the sample and hold circuit unit 425 also decreases, so the input voltage of the linear regulator 430 decreases, and thus the output voltage also decreases. As a result, the supply voltage to the power amplifier 330 is decreased, and thus the output voltage also decreases. As a result, the output voltage of the envelope detector also decreases, and after a certain time, negative feedback operates and the output voltage of the power amplifier converges to a constant value.

Referring back to FIG. 1, the reading circuit unit 120 is a means for measuring the RF signal output from the MEMS sensor 101. The MEMS sensor 101 may measure a microplastic concentration of a target by measuring a resonance frequency displacement value (referred to as an RF signal for convenience) that varies depending on the change in dielectric constant.

FIG. 6 shows a detailed configuration of the reading circuit unit 120.

Referring to FIG. 6, the reading circuit unit 120 includes a plurality of measurement channel front end circuit units 610, a multiplexer 615, and an analog-to-digital conversion circuit unit 620.

The plurality of measurement channel front end circuit units 610 receive RF signals output from the MEMS sensor. In FIG. 6, the measurement channel front end circuit unit 610 is shown on the assumption that it is composed of three measurement channels, but the number of measurement channels is not necessarily limited to three.

The measurement channel front end circuit unit 610 is configured to include an envelope detector 612 and an amplifier 614.

The envelope detector 612 detects the resonance frequency displacement value according to the change in dielectric constant of the MEMS sensor 101, and the detected resonance frequency displacement value may be amplified by the amplifier 614 and output.

As shown in FIG. 6, the envelope detector 612 is implemented in a differential structure to remove noise, and the amplifier 614 may be configured as a variable gain amplifier capable of changing a gain value by adjusting the feedback resistance value.

A buffer may be disposed between the envelope detector 612 and the amplifier 614.

A multiplexer 615 is disposed at a rear end of the measurement channel front end circuit unit 610.

The multiplexer 615 combines output signals (RF signals) of the plurality of measurement channel front end circuit units 612 into one and outputs the output signals to the analog-to-digital conversion circuit unit 620 disposed at the rear end.

The analog-to-digital conversion circuit unit 620 is a circuit for converting an analog signal into a digital signal.

In this way, the reading circuit unit 120 may convert the RF signal output from the MEMS sensor 101 into a DC signal and output the DC signal to the controller. Here, the converted DC signal may linearly represent the change in size of the input RF signal.

The controller 130 is a means for controlling the internal components (e.g., variable frequency driver circuit unit 110 and reading circuit unit 120, etc.) of the microplastic concentration monitoring apparatus according to an embodiment of the present invention.

FIG. 7 is a graph illustrating the change in output power according to the change in frequency of the variable frequency driver circuit unit according to an embodiment of the present invention. As illustrated at 710 in FIG. 7, it can be seen that the variable frequency driver circuit unit according to an embodiment of the present invention compensates for the output power change to 0.5 dBm or less through feedback even if the input impedance matching is greatly distorted due to mismatch.

Hereinabove, the present invention has been described with reference to exemplary embodiments thereof. It will be understood by those skilled in the art to which the present invention pertains that the present invention may be implemented in a modified form without departing from essential characteristics of the present invention. Therefore, the exemplary embodiments disclosed herein should be considered in an illustrative aspect rather than a restrictive aspect. The scope of the present invention should be defined by the claims rather than the above-mentioned description, and equivalents to the claims should be interpreted to fall within the present invention.

What is claimed is:

1. A micro concentration monitoring apparatus, comprising:
   a variable frequency driver circuit unit that is connected to a MEMS sensor through a coupler and supplies constant power to the MEMS sensor within a set bandwidth; and
   a reading circuit unit that measures a resonance frequency displacement value of the MEMS sensor according to a change in dielectric constant of a target based on power supplied from the variable frequency driver circuit, and measures the resonance frequency displacement value of the MEMS sensor through a plurality of measurement channels, respectively.

2. The micro concentration monitoring apparatus of claim 1, wherein the variable frequency driver circuit unit comprises:
   a digital-to-analog conversion circuit unit;
   a voltage control oscillator that is disposed at a rear end of the digital-to-analog conversion circuit unit and outputs a variable frequency signal according to an input voltage output from the digital-to-analog conversion circuit unit;
   a power amplifier that is located at a rear end of the voltage-controlled oscillator and outputs an output voltage by amplifying a frequency signal of the voltage-controlled oscillator; and
   a negative feedback loop circuit unit that compensates for input impedance mismatch of the power amplifier.

3. The micro concentration monitoring apparatus of claim 2, wherein the negative feedback loop circuit unit comprises:
   a linear regulator that provides a supply voltage to the power amplifier;
   an envelope detector that is disposed at a rear end of the power amplifier;
   a subtractor that is disposed at a rear end of the envelope detector; and a sample and hold circuit unit that is disposed at a rear end of the subtractor,
   wherein, when an output voltage of the subtractor decreases before the envelope detector is saturated to a certain voltage, as the output voltage of the sample and hold circuit unit decreases and is applied to the linear regulator, the supply voltage to the power amplifier decreases and an input impedance mismatching is compensated.

4. The micro concentration monitoring apparatus of claim 3, wherein a power divider is further provided at the rear end of the power amplifier to distribute the output voltage of the power amplifier, and
   the envelope detector is disposed at one end of the power divider, and a dual frequency controller is disposed at the other end thereof.

5. The micro concentration monitoring apparatus of claim 4, wherein the dual frequency controller adjusts the sampling frequency of the sample and hold circuit unit to a desired value before the output voltage of the power amplifier converges to a constant value.

6. The micro concentration monitoring apparatus of claim 1, wherein the reading circuit unit comprises:
   a plurality of measurement channel front-end circuit units that receive an RF signal output from the MEMS sensor;
   a multiplexer that combines output signals of the plurality of measurement channel front-end circuit units into one; and
   an analog-to-digital conversion circuit unit that is disposed at a rear end of the multiplexer.

7. The micro concentration monitoring apparatus of claim 6, wherein the plurality of measurement channel front-end circuit units each comprise:
   an envelope detector that detects the RF signal output from the MEMS sensor; and
   an amplifier that is disposed at a rear end of the envelope detector and amplifies an output signal of the envelope detector.

* * * * *